United States Patent Office 3,398,440
Patented Aug. 27, 1968

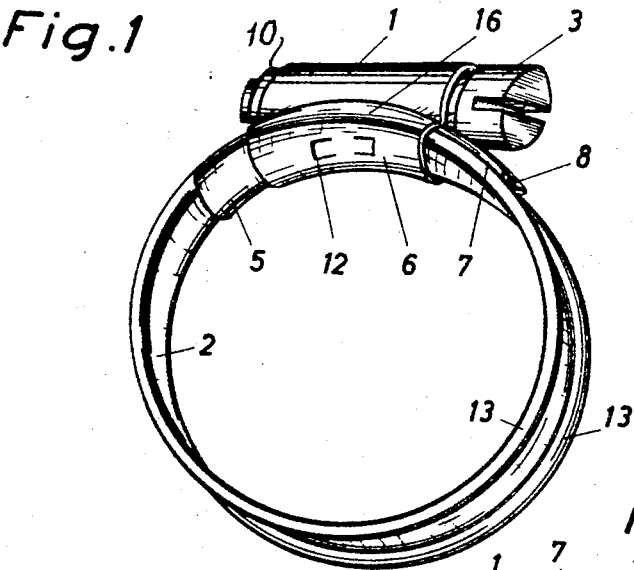
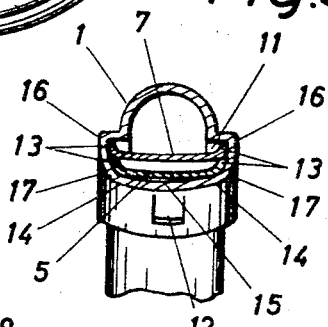
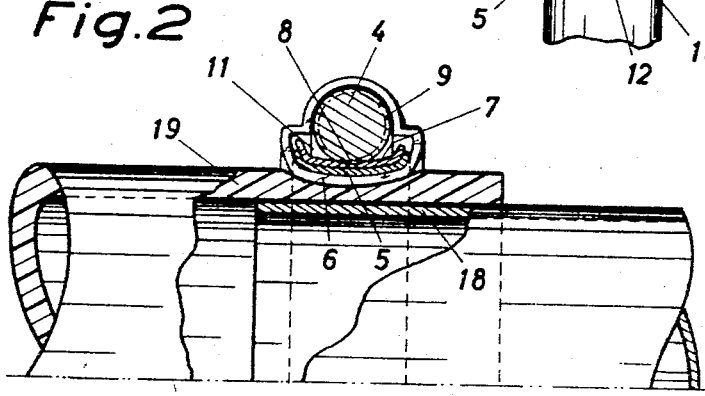

3,398,440
HOSE CLAMP
Karl Erik Lennart Bergstrom, Scheelegatan 28,
Stockholm K, Sweden
Filed July 5, 1966, Ser. No. 562,869
3 Claims. (Cl. 24—274)

ABSTRACT OF THE DISCLOSURE

An improved hose clamp wherein a steel strip is bent to annular shape with the ends of the strip overlapping. The outer end of the overlapped strip is provided with transverse grooves to cooperate with a worm located rotatably in a sleeve but axially unslidable therein. The inner strip end is secured to the sleeve spaced from the worm and the outer strip and moves between such inner strip and the worm when the worm is rotated. The longitudinal edges of the strip are turned upwardly and outwardly so that when the clamp is tightened upon a hose such longitudinal edges of the strip will not damage the hose.

---

This invention relates to hose clamps of the kind formed of a strip, usually made of steel, bent to annular shape with the ends of the strip overlapping. The radially outer end of the strip is provided on its external side with transverse grooves which are engaged in use by the threads of a headed worm, being rotatably journalled but axially unslidable in a sleeve enclosing the worm as well as the radially inner strip end which is adapted to be secured in the sleeve bottom, and having a space permitting the outer strip end to move between the inner strip end and the worm by rotating the latter. In hose clamps of this kind, however, the steel strip is exerting a cutting action on the rubber material of the hose being tightened by the clamp, e.g., around a connection piece. This cutting action arises for instance from vibrations, such as occur at the connection between the engine and radiator of a car or similar connections in an aeroplane. One has tried to prolong the duration of the hose by providing an accumulation of material at that portion thereof which is surrounded by the steel strip of the clamp or by providing the hose with a particular, reinforced section at the point of connection. However, such provisions increase the cost of manufacturing the hose.

The object of the present invention is, among other things, to eliminate this drawback. The characterising feature of the invention is to be seen therein that the strip has its longitudinal edges turned upwards and that the sleeve bottom has inclined side portions sloping obliquely downwards from the side walls of the sleeve towards the central portion of the bottom. By shaping the strip and the sleeve bottom in this manner, considerable advantages are obtained. The turned-up, longitudinal edges of the strip prevent the strip from damaging the hose. Because of the inclination of the sleeve bottom towards the sleeve walls good connection is obtained between the sleeve and the hose and it is furthermore ensured that the sleeve does not either damage the hose through vibrations. As will be explained more in detail in the following, a certain tension occurs in the strip at the tightening of the worm thanks to the turned-up, longitudinal edges, this tension resulting in a resilient, good contact of the radially outer strip end with the worm, a firm engaging grip being thereby ensured between the grooves of the worm and the strip. The inclined side portions of the bottom extending towards the central portion of the sleeve bottom give the sleeve a considerable rigidity and prevent the central portion of the sleeve bottom from springing out of engagement at the tightening of the worm. This constructional detail consequently helps in maintaining the engagement between the threaded grooves of the screw and the strip end at its optimum value.

The invention will be described more in detail in the following, and for purposes of illustration but not of limitation, an embodiment of the invention is shown in the accompanying drawing in which:

FIG. 1 is a perspective view of the hose clamp in accordance with the invention;

FIG. 2 is a cross section on a larger scale of the hose clamp and the end of a hose threaded on a connection piece, and FIG. 3 is a cross section of the hose clamp devoid of the worm.

The hose clamp illustrated in the drawings comprises a sleeve 1 which is imagined manufactured as a seamless tube, a steel strip 2 and a worm 4 with a head 3. The strip 2 is bent to annular shape. Its radially inner end portion 5 is attached to the bottom 6 of the sleeve 1 and its radially outer end portion 7 is on its external side provided with transverse grooves 8 meshing with the threads 9 of the worm 4. An end washer 10 is riveted on to the end of the worm 4 situated opposite the head 3 in such a way that the worm can be rotated but not axially displaced in the sleeve 1. The sleeve bottom 6 is provided with an elongated shoulder 12 projecting upwards into the space 11 which is formed between the bottom 6 and the worm, said shoulder 12 engaging with an elongated recess (not shown) made in the strip end 5 to fasten the latter firmly on the sleeve 1 as shown in Patent No. 2,571,659 granted Oct. 16, 1951 to Knut Edwin Bergström.

The longitudinal edges 13 of the strip 2 are turned slightly upwards, giving the strip a groove-like shape. The side portions 14 of the bottom 6 slope downwards towards the central portion 15. A smoothly bent portion 17 forms a transition between the side walls 16 of the sleeve 1 and the inclined bottom portions 14. The space 11 allows sufficient room for the end portions 5 and 7 of the strip 2.

By 18 is designated a pipe socket and by 19 a hose threaded onto said socket. A hose clamp in accordance with the invention is arranged around the hose 19. By tightening the worm 4 the diameter of the strip 2 is reduced in the conventional manner, the strip fastening the hose 19 around the pipe socket 18. There is no risk that the edges of the strip 2 or the sleeve 1 will tear the hose 19.

As is apparent from FIG. 3, the strip end portion 7 initially rides with its longitudinal edges 13 on the longitudinal edges of the strip end portion 5 when the end portion 7 is being inserted in the space 11 in the sleeve 1. As is apparent from FIG. 2, the worm 4 then presses the strip end portion 7 against the action of the resiliency in the steel strip downwards towards the strip end portion 5. The elastic resiliency remains and ensures that a firmly engaging grip is obtained between the grooves of the worm 4 and the strip 2. The rounded bottom 6 of the sleeve is able to withstand considerable compression strains arising at the tightening of the worm 4. Thanks to the resiliency of the strip 2, the worm 4 is likewise firmly secured. Because of its longitudinal edges 13 being turned outwards, the strip 2 becomes comparatively rigid and it can be manufactured using less material thickness than has previously been possible.

The embodiment of the hose clamp has been described in the aforegoing for purposes of illustration only and is not intended to be limited by this description or otherwise, except as defined in the appended claims. Particularly the sleeve can be constructively modified in a variety of ways without departing from the scope of the appended claims. The sleeve thus need not be made from a seamless tube but can be manufactured by bending a sheet billet in such a way that the joint extends along the central portion of the bottom 6. The strip can be made from other material than steel.

What I claim is:

1. An improved hose clamp comprising a flexible strip bent to annular shape with the ends of the strip overlapping, there being transverse grooves in the radially overlapped outer end of said strip, a headed worm having threads to mesh with said transverse grooves, a sleeve, said worm being rotatably journalled but axially unslidable in said sleeve, said radially inner strip end being secured to said sleeve spaced from said worm, said radially outer strip end moving between said inner strip end and said worm when said worm is rotated and the longitudinal edges of said strip being turned upwardly and outwardly so that when said worm is rotated to tighten said clap upon a hose said longitudinal edges of said strip will not damage the hose and so that the free end of the strip will resiliently contact the worm to ensure a firm grip between the threads of the worm and the grooves of the strip.

2. A hose clamp as claimed in claim 1, wherein said strip is steel.

3. A hose clamp as claimed in claim 1, wherein said sleeve has a bottom portion to receive said overlapped ends of said strip and the side portions of said bottom portion continue in a smooth bend into the wall of said sleeve.

References Cited

UNITED STATES PATENTS 2,571,659   10/1951   Bergström _____ 24—274

FOREIGN PATENTS 104,484   3/1917   Great Britain.
573,695   12/1945   Great Britain.

DONALD A. GRIFFIN, *Primary Examiner.*